Jan. 26, 1926. 1,570,643
F. S. RIPPINGILLE
FUEL CONSUMPTION METER FOR USE WITH LIQUID FUEL ENGINES
Filed June 9, 1923 5 Sheets-Sheet 1
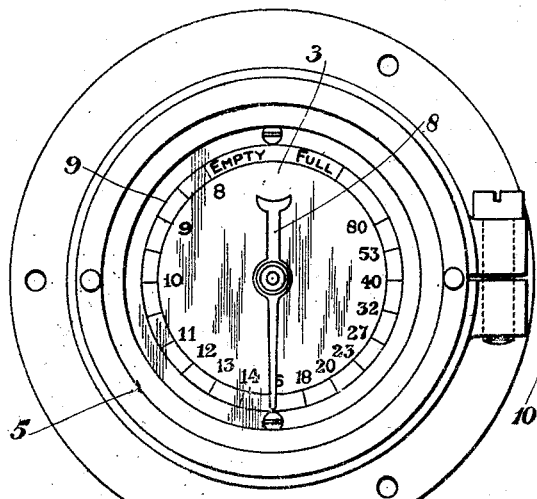
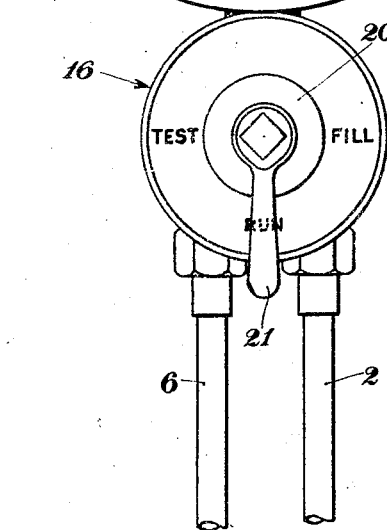
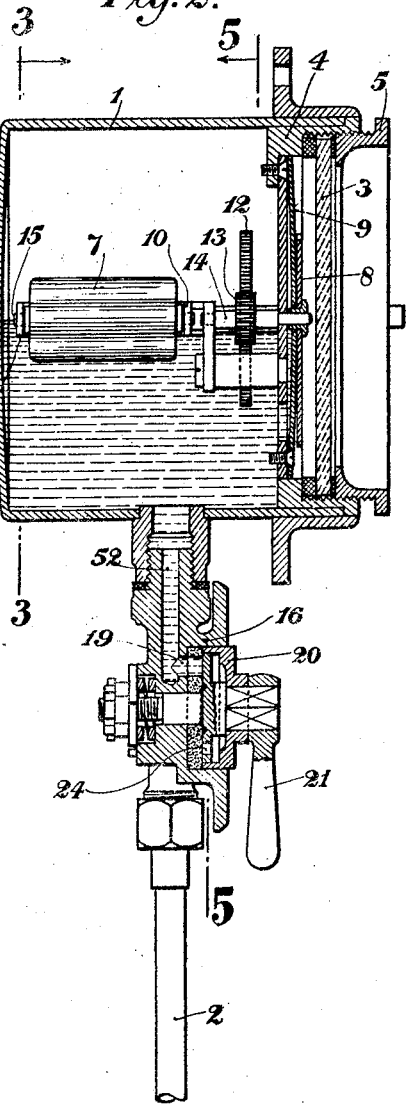
INVENTOR:
Frank S. Rippingille
By Richards & Geier
Attys.

Jan. 26, 1926.  
F. S. RIPPINGILLE  
1,570,643  
FUEL CONSUMPTION METER FOR USE WITH LIQUID FUEL ENGINES  
Filed June 9, 1923  
5 Sheets-Sheet 2
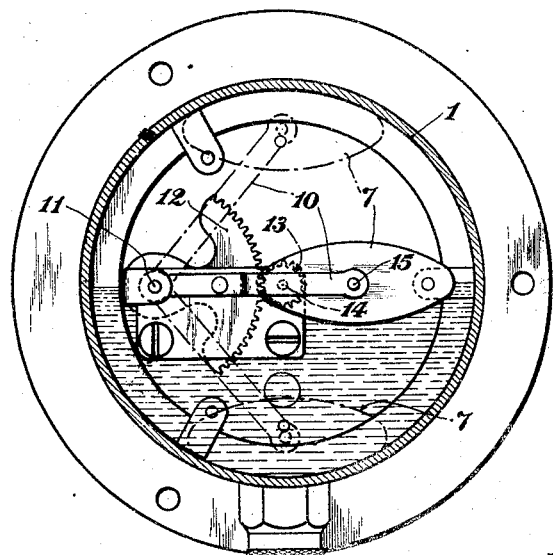
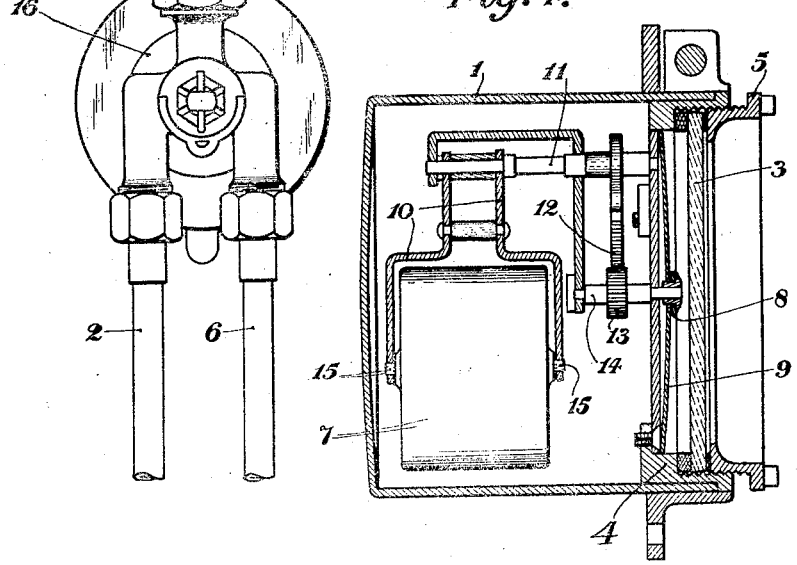
INVENTOR:  
Frank S. Rippingille  
By Richards. Grier  
Attys.

Jan. 26, 1926.
F. S. RIPPINGILLE
1,570,643
FUEL CONSUMPTION METER FOR USE WITH LIQUID FUEL ENGINES
Filed June 9, 1923      5 Sheets-Sheet 3
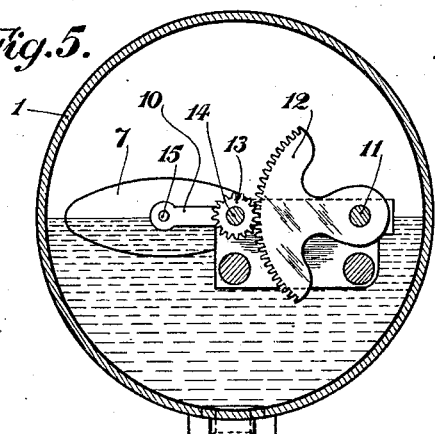
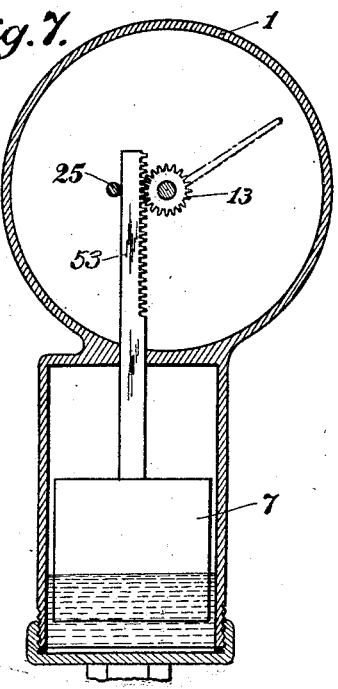
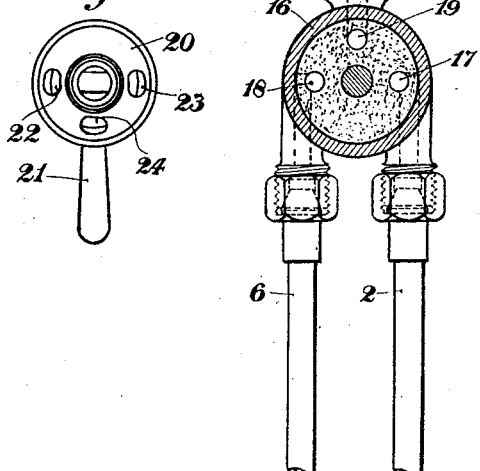
INVENTOR
Frank S. Rippingille
By Richards Geier
Attys.

Jan. 26, 1926.  
F. S. RIPPINGILLE  
1,570,643  
FUEL CONSUMPTION METER FOR USE WITH LIQUID FUEL ENGINES  
Filed June 9, 1923  
5 Sheets-Sheet 4

INVENTOR  
Frank S. Rippingille  
By Richards & Geier  
Attys.

Jan. 26, 1926.  1,570,643
F. S. RIPPINGILLE
FUEL CONSUMPTION METER FOR USE WITH LIQUID FUEL ENGINES
Filed June 9, 1923    5 Sheets-Sheet 5

INVENTOR
Frank S. Rippingille
By Richards Geier
Attys.

Patented Jan. 26, 1926.

1,570,643

UNITED STATES PATENT OFFICE.

FRANK SIDEBOTHAM RIPPINGILLE, OF BIRMINGHAM, ENGLAND.

FUEL CONSUMPTION METER FOR USE WITH LIQUID-FUEL ENGINES.

Application filed June 9, 1923. Serial No. 644,425.

*To all whom it may concern:*

Be it known that I, FRANK SIDEBOTHAM RIPPINGILLE, a subject of the King of Great Britain, residing at Birmingham, England, have invented certain new and useful Improvements in Fuel Consumption Meters for Use with Liquid-Fuel Engines, of which the following is a specification.

This invention relates to liquid-fuel consumption meters for use with liquid-fuel engines, such as used on motor vehicles, motor boats and the like, for the purpose of registering the consumption of fuel, particularly in terms of distance travelled during the consumption of a given quantity of fuel, such as the number of miles travelled during the consumption of a gallon of fuel.

The object of the present invention is to provide an improved construction of fuel consumption meter which is efficient in action and which enables the readings to be accurately and easily taken.

According to this invention the improved device consists of an auxiliary receptacle or chamber separate from the main fuel tank (from which it may be filled) and containing a float, said receptacle being connected to the carburetter so that the float falls as the fuel flows to the latter, and, in falling, is arranged, through the medium of mechanical gearing which may be housed in the same receptacle or casing that contains the float, to turn or rotate a pointer which moves over a scale or dial which may be graduated in terms of distance traveled per unit quantity of fuel, such as miles per gallon or the equivalent, or in a modified arrangement, the total fuel consumption during a journey.

Figure 1 of the accompanying drawings represents a front view of a fuel consumption meter constructed in accordance with this invention.

Figure 2 is a vertical section through the same with the float and pointer actuating mechanism in elevation.

Figure 3 is a section on the line 3—3, Figure 2, with the position which the float assumes as the level falls represented by dotted lines.

Figure 4 shows the float and actuating mechanism in plan, with the outer casing in section.

Figure 5 is a section on the line 5—5 Figure 2, looking in the direction of the arrow.

Figure 6 shows a view of the inner face of the outer disc of the three-way cock.

Figure 7 shows a modified arrangement which may be employed.

Figure 8:
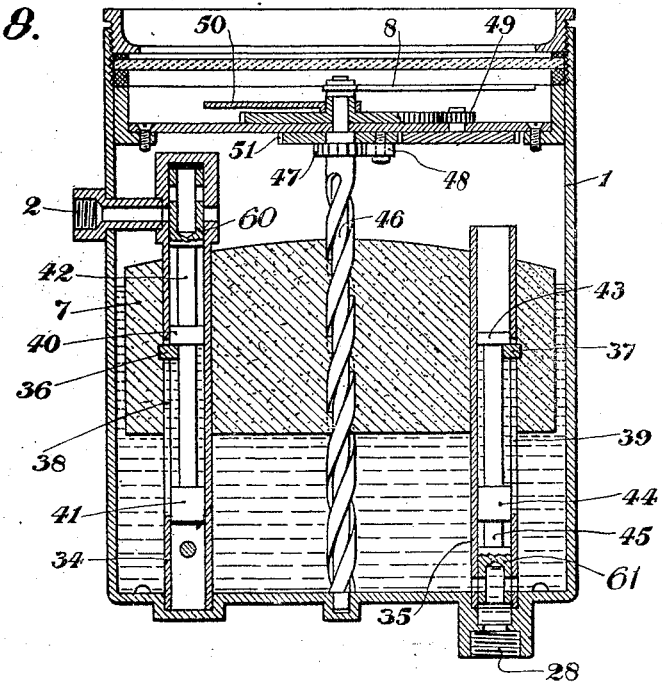
Figure 8 shows a further modification wherein the total consumption of fuel may be indicated in addition to rate of consumption.

Referring to Figures 1 to 6 of the drawings, the improved fuel consumption meter consists of a cylindrical or other suitably shaped vessel or chamber 1 which is separate from the main fuel tank, and which is adapted to be filled from the latter by means of an inlet pipe 2, the said chamber being rendered fluid-tight by means of a tightly-fitting glass front 3 held firmly against a flange 4 by means of an externally screwed ring 5, suitable washers being interposed to give a tight joint. The chamber 1 when filled is adapted to be placed in communication with the carburetter by means of a pipe 6 through which the fuel flows. A float 7 is arranged within the chamber and is arranged to fall with the level of the fuel as the latter passes to the carburetter, and in falling is arranged to turn or rotate a pointer or finger 8, so that the latter moves over a graduated dial 9 at the front of the instrument. For this purpose the float 7 is provided with pivot pins 15 and is pivotally mounted between the outwardly-cranked ends of a pair of arms 10 extending at right angles to a shaft 11 to which they are fixed at their opposite ends as shown in Figure 4. This shaft 11 is rotatably mounted within bearings and carries near its forward end a relatively fixed toothed quadrant or sector 12 whose teeth engage with a pinion 13 carried by a spindle 14. The forward end of this spindle 14 passes through a central opening in the dial plate 9 and carries the pointer 8 which is secured to its extremity. The dial 9 is graduated, as shown in Figure 1, to indicate the consumption of fuel in terms of miles per gallon. Both the inlet pipe 2 and outlet pipe 6 communicate with a single passage 52 through a three-way tap, the said passage 52 opening into the bottom of the chamber 1. The three-way tap comprises a fixed plate or body 16 provided with three openings 17, 18 and 19 which communicate respectively with the pipes 2 and 6 and the passage 52. Any two of these openings are adapted to be put into communication with one another by means of a rotatable disc 20 which fits within a concentric recess in the plate or body 16 and which may be turned by means of the handle 21. This rotatable disc 20 is of a hollow, cylindrical box-formation, and is formed with three openings 22, 23 and 24 in its inner face, any two of these openings being adapted to be brought into register with two of the openings in the fixed plate or body part 16. Thus, by turning the disc 20 so that the openings 22 and 23 therein register with the openings 17 and 18 in the body part, the fuel flows from the pipe 2 into the pipe 6 and thence to the carburetter without passing through the instrument. If, however, the holes 22 and 24 in the rotatable disc are turned into register with the holes 19 and 17 in the body part 16, the fuel passes up into the chamber 1 and so fills the latter. In this position the holes 23 are also registering with the holes 18, so that fuel may also pass directly to the carburetter to maintain the running of the engine. After the chamber 1 is filled with fuel the rotatable disc 20 is turned so that the openings 23 and 24 in the same register with the openings 18 and 19 in the fixed body part of the three-way tap and the fuel is thus allowed to pass from the chamber 1 into the carburetter, the inlet pipe 2 to the vessel being closed. A cork or other facing having holes registering with the holes in the body part 16 may be employed between the latter and the rotatable disc 20 to give a fluid-tight joint.

The float 7 is preferably elliptical in cross-section so that it may fit closely against the top of the chamber 1 when the latter is filled, the mechanism being thereby operated immediately the fuel level falls.

Under ordinary conditions the fuel is allowed to pass from the pipe 2 to the pipe 6 and thence to the carburetter without passing through the instrument. To use the device, however, the pipe 2 is placed in communication with the chamber 1 so that the latter is filled with the fuel, the float 7 rising until the pointer 8 is turned to the upper right-hand side portion of the dial. The disc 20 of the three-way cock is then turned to close the pipe 2 and place the vessel 1 in communication with the pipe 6 leading to the carburetter. The vehicle is then run for a measured mile and during this time the fuel passes from the vessel 1 to the carburetter so that the fuel level gradually falls, the float 7 falling a corresponding amount and turning the pointer 8 through the medium of the gearing, the said pointer 8 moving over the graduated scale on the dial 9. At the end of the measured mile the pipe 6 is closed by turning the disc 20 and the position of the pointer observed, the position which it occupies on the scale giving the amount of fuel consumed in miles per gallon. By employing a rotating pointer in this manner the scale readings may be very accurately and readily observed. The device is preferably mounted upon the dashboard of the vehicle where it may readily be seen.

Referring to Figure 7 of the drawings, the float 7 may carry a vertical rack 53 which gears with the pinion 13 on the pointer spindle, instead of being provided with a toothed quadrant as above described, the movement of the float 7 actuating the pointer so that the latter indicates by the scale the fuel consumption in miles per gallon, as above described. The lower portion of the vessel 1 is preferably of a cylindrical shape of a diameter slightly larger than the diameter of the float 7 so that it serves as a guide for the latter and keeps the same, together with the rack 53, vertical. A guide pin 25 may be provided in addition to keep the rack in engagement with the pointer pinion.

Another form in which total consumption is registered in addition to distance covered for a given quantity of fuel, is shown in Figure 8. The float 7 rises and falls within the vessel 1 and is guided by upright tubular guides 34, 35, which respectively contain the inlet and outlet valves 60, 61, controlling the inlet 2 and outlet 28. These valves are automatically operated by the float so that the inlet valve opens when the chamber empties and closes when the chamber fills, while the outlet valve closes when the chamber empties and opens when it fills. For this purpose the float carries projections 36, 37, respectively engaging slots 38, 39 in the guides 34, 35, and arranged respectively to make contact with collars 40, 41 on the stem 42 of inlet valve 29 and with collars 43, 44, on the stem 45 of outlet valve 30. While the projections 36, 37 move between the collars on the valve stems the valves are held in their open and closed position by friction or by suitable retaining devices. To effect the registering of the rate of consumption in terms of distance covered for a given quantity of fuel, the float has a central hole internally screw-threaded to engage a quick-pitched screw-shaft 46 carrying a pointer 8 moving over a scale, as in Figure 1. To register the total consumption over a journey, the screw-shaft 46 carries a ratchet wheel 47 engaged by a pawl 48 carried by a toothed wheel 51 which actuates through reduction gearing 49 a second pointer 50, moving over a suitably graduated scale. As the float rises the pawl 47 moves idly over the ratchet wheel, but each time it descends and the vessel empties, the pawl moves the pointer through the gearing.

Figure 9:
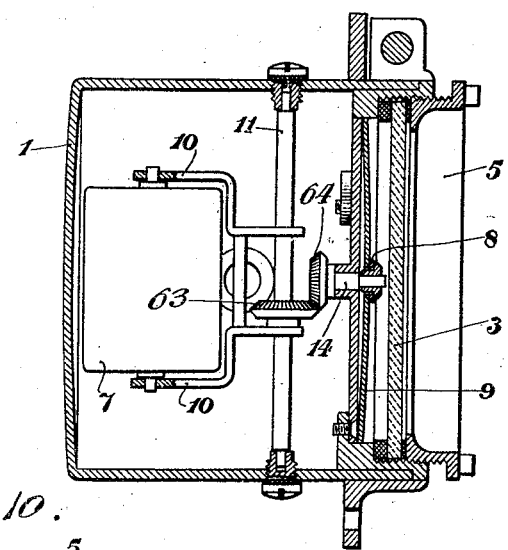
Figure 9 is a horizontal section through another arrangement, with the float and pointer mechanism in plan.

In the arrangement shown in Figure 9 the float 7 is pivotally mounted between the forked end of a member 10 fixed to a shaft 11 extending transversely across the fuel container 1 and rotatably mounted in bearings in the sides of the latter. This cross-shaft 11 carries a bevel wheel 63 gearing with a bevel wheel 64 at right angles thereto, and mounted upon a spindle 14 which carries the pointer 8. Thus, as the float falls the shaft 11 and bevel wheel 63 are turned and the spindle 14 and pointer 8 operated through the medium of the bevel wheel 64. If desired, where it is not practicable to mount the container 1 on the dash, the spindle 14 may carry a second bevel wheel upon its outer end which gears with a bevel wheel on a flexible shaft, this flexible shaft being arranged to operate a pointer upon the dash-board.

Figure 10:
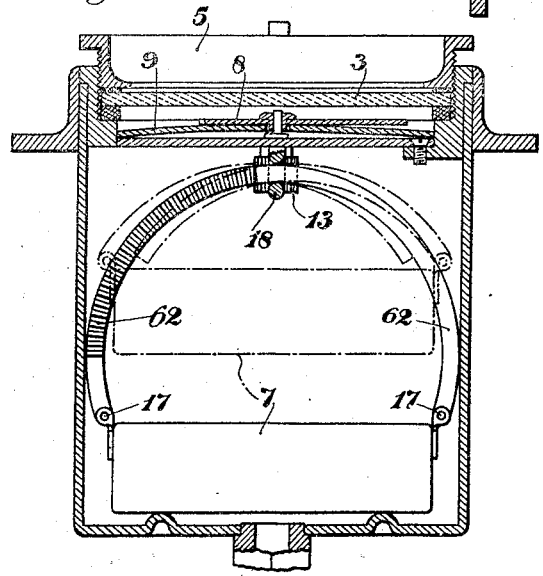
Figure 10 shows an additional modified arrangement.

A further arrangement is shown in Figure 10 of the drawings in which a pair of segmental-shaped metal strips 62 are hinged at 17 to the float 7. These segmental strips 62 are provided with teeth upon their adjacent edges, the teeth engaging the opposite sides of a toothed wheel 13 mounted upon a shaft carrying the pointer 8. When the fuel vessel 1 is full the toothed segmental strips 12 assume approximately the position represented by dotted lines; as, however, the fuel level sinks the said segmental strips are moved downwards by the float and are guided by a loop 18 until they assume the position shown in full lines, thus turning the toothed wheel 13 and operating the pointer.

The improved fuel consumption meter may be mounted upon the dash-board or on any other suitable part of the vehicle.

Where the device is only required for testing the consumption in terms of distance run to a given quantity of fuel, such as in terms of miles to the gallon, and where the main fuel tank is below the level of the meter, the fuel may be raised in order to fill the meter, when required, by means of a hand-operated pump.

Any suitable arrangement or gearing may be employed for enabling the movement of the float to impart a rotary or turning movement to the pointer.

Having fully described my invention, what I desire to claim and secure by Letters Patent is:—

1. A fuel consumption meter for liquid-fuel engines comprising a fuel chamber, a three-way cock adapted to connect the fuel chamber either to the engine or to a supply tank or to connect the supply tank direct to the engine, a float within the fuel chamber, a dial provided with graduations showing rates of fuel consumption, a pointed adapted to move over said scale, and mechanical gearing between the float and the pointer whereby the said pointer is turned when the float falls due to the emptying of the chamber.

2. A fuel consumption meter for liquid-fuel engines comprising a fuel chamber, means for connecting and disconnecting the fuel chamber to and from a supply tank and for connecting the fuel chamber to the engine, a rotatable shaft within the fuel chamber, an arm rigid with said shaft so as to move angularly with the latter, a float carried by said arm, a gear member fixed upon the said shaft, a dial provided with graduations showing rates of fuel consumption, a pointer adapted to move over said scale, a spindle carrying the pointer, and a gear member on the pointer spindle gearing with the gear member on the rotatable shaft, whereby the pointer is turned when the float descends due to the emptying of the fuel chamber.

3. A fuel consumption meter for liquid-fuel engines comprising a fuel chamber, means for connecting and disconnecting the fuel chamber to and from a supply tank and for connecting the fuel chamber to the engine, a rotatable shaft within the fuel chamber, an arm rigid with said shaft so as to move angularly with the latter, a float pivotally mounted upon said arm, a gear member fixed upon the said shaft, a dial having graduations showing rates of fuel consumption, a pointer adapted to move over said scale, a spindle carrying the pointer, and a gear member on the pointer spindle gearing with the gear member on the rotatable shaft whereby the pointer is turned when the float descends due to the emptying of the fuel chamber.

In testimony whereof I have hereunto set my hand.

FRANK S. RIPPINGILLE.